Patented May 1, 1934

1,957,089

UNITED STATES PATENT OFFICE 1,957,089

PROCESS OF PREPARING NITRO-β-HYDROXY PYRIDINES

Otto Wulff, Hofheim in Taunus, Germany, assignor to I. G. Farbenindustrie Aktiengesellschaft, Frankfort-on-the-Main, Germany No Drawing. Application July 17, 1931, Serial No. 551,568. In Germany August 2, 1930

4 Claims. (Cl. 260—42)

The present invention relates to the preparation of nitrates of β-hydroxypyridine and its alkyl derivatives and nitro-β-hydroxypyridine and its alkyl derivatives.

I have found that nitro-β-hydroxy compounds of the pyridine series can be obtained by first causing nitric acid to act upon a compound of the following formula:

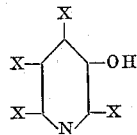

wherein X stands for hydrogen or at most three X's stand for alkyl groups and then eliminating water from the nitrate thus obtained by the action of sulfuric acid.

The reaction proceeds in the following manner: When reacting with nitric acid upon β-hydroxypyridine or its alkyl derivatives there is first obtained the corresponding nitrate of the formula

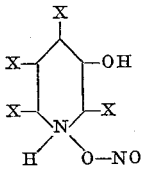

the X's having the same meaning as in the above formula, whereupon, under the influence of sulfuric acid, the group —NO$_2$ substitutes one hydrogen atom of the pyridine nucleus, thus forming the corresponding nitro-hydroxypyridine or nitro-hydroxyalkylpyridine compound. The hydrogen atom replaced by the nitro group combines with the hydrogen atom and oxygen atom attached to the nitrogen and is eliminated in the form of water.

The easy formation of nitrates of β-hydroxypyridines and their conversion into nitro-β-hydroxy derivatives of the pyridine series are surprising, because it is known that even aqueous nitric acid has a nitrating and oxidizing action upon phenol or other aromatic hydroxy-compounds.

As a starting material there may for instance be used 3-hydroxy-pyridine, 5-hydroxy-2-methyl-pyridine, 3-hydroxy-2-methyl-5-ethyl-pyridine, 3-hydroxy-2.4.5-trimethyl-pyridine, 5-hydroxy-2-propyl-pyridine, 5-hydroxy-2-butyl-pyridine.

The nitrates are colorless substances which crystallize well; they decompose when heated. The nitro-β-hydroxy-pyridine compounds obtained from them are identical with the corresponding substances obtainable according to process described in my co-pending U. S. application Serial No. 485,311, filed on September 29, 1930.

The following examples serve to illustrate the invention, but they are not intended to limit it thereto:

1. 32 grams of β-hydroxypyridine are dissolved in 200 cc. of a nitric acid of a specific gravity of 1.053 and the solution is evaporated on the water-bath to a considerable extent. After cooling, the colorless nitrate which has crystallized is filtered by suction and carefully dried. The yield amounts to 52 grams; melting point 133° C. with decomposition.

These 52 grams of β-hydroxypyridine-nitrate are introduced at 50° C. into 300 cc. of concentrated sulfuric acid and the whole is further heated for a quarter of an hour at 50° C. The sulfuric acid may also be caused to run into the nitrate and the mixture then stirred, if necessary while heating, until the reaction is complete. After cooling to room temperature, the reaction mixture is introduced into ice water, while stirring, and worked up in the usual manner. 23 grams of nitro-β-hydroxypyridine (=50 per cent. of the theory) are obtained; melting point 68° C.-69° C.

2. 18 grams of 5-hydroxy-2-methylpyridine are converted into the nitrate in the manner described in Example 1. The yield amounts to 26 grams; melting point 125° C.-126° C. with decomposition.

These 26 grams of 5-hydroxy-2-methylpyridine-nitrate are gradually introduced at 20° C. into 150 cc. of concentrated sulfuric acid, while stirring. Stirring is continued for half an hour. The mixture is then introduced into ice water, while stirring during which operation the nitro-5-hydroxy-2-methylpyridine immediately separates in form of crystals. A further quantity can still be obtained from the mother liquor. The yield amounts to 20 grams (=80 per cent. of the theory); melting point 107° C.-108° C.

3. 18 grams of 3-hydroxy-4-methylpyridine, obtainable according to the process described in my co-pending U. S. application Serial No. 405,289, filed on November 6, 1929 are converted into the nitrate in the manner described in Example 1. The yield amounts to 24 grams; melting point 136° C. with decomposition.

These 24 grams of 3-hydroxy-4-methylpyridine-nitrate are gradually introduced, while well cooling, into 150 cc. of concentrated sulfuric acid, the temperature being kept at 0°-5° C. The mass is then introduced into ice water, while stirring, and worked up in the manner described in Example 2.

17 grams of nitro-3-hydroxy-4-methylpyridine (=74 per cent. of the theory) are obtained; melting point 90° C.-92° C.

4. 11.5 grams of 3-hydroxy-2-methyl-5-ethylpyridine (obtainable according to the process described in my co-pending U. S. application Serial No. 405,289, filed on November 6, 1929 are dissolved in 50 cc. of a nitric acid of specific gravity of 1.053 and the solution is carefully evaporated, finally under reduced pressure and at a temperature below 60° C. The residue, which is at first a thick oil, constitutes the nitrate of the 3-hydroxy-2-methyl-5-ethyl-pyridine and can immediately be worked up. After standing for a long time, the nitrate crystallizes; it forms colorless crystals which are very easily soluble in water, melt at 76° C.-78° C. and decompose at 95° C.-100° C.

For converting the nitrate into the nitro-compound, the crude nitrate is introduced, while well cooling, into 75 cc. of concentrated sulfuric acid at a temperature of 0°-5° C. The product is worked up as described in Example 2.

6 grams of nitro-3-hydroxy-2-methyl-5-ethyl-pyridine (=42 per cent. of the theory) are obtained; melting point 163° C.-165° C.

I claim:

1. The process which comprises causing nitric acid to act upon a compound of the following formula:

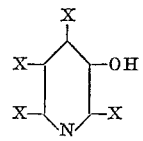

wherein X stands for hydrogen or at most three X's stand for alkyl groups and then causing sulfuric acid to act upon the nitrate thus obtained.

2. The process which comprises causing nitric acid to act upon β-hydroxypyridine and then causing sulfuric acid to act upon the nitrate thus obtained.

3. The process which comprises causing nitric acid to act upon 5-hydroxy-2-methyl-pyridine and then causing sulfuric acid to act upon the nitrate thus obtained.

4. The process which comprises causing nitric acid to act upon 3-hydroxy-4-methyl-pyridine and then causing sulfuric acid to act upon the nitrate thus obtained.

OTTO WULFF.